US011933097B2

(12) United States Patent
Paulsson

(10) Patent No.: US 11,933,097 B2
(45) Date of Patent: Mar. 19, 2024

(54) AUTOMATIC DOOR OPERATOR AND METHOD OF OPERATING AUTOMATIC DOOR OPERATOR

(71) Applicant: Assa Abloy Entrance Systems AB, Landskrona (SE)

(72) Inventor: Stefan Paulsson, Odakra (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 361 days.

(21) Appl. No.: 17/415,481

(22) PCT Filed: Dec. 17, 2019

(86) PCT No.: PCT/EP2019/085512
§ 371 (c)(1),
(2) Date: Jun. 17, 2021

(87) PCT Pub. No.: WO2020/127171
PCT Pub. Date: Jun. 25, 2020

(65) Prior Publication Data

US 2022/0065023 A1 Mar. 3, 2022

(30) Foreign Application Priority Data

Dec. 19, 2018 (SE) .................................... 1830365-1

(51) Int. Cl.
*E05F 15/77* (2015.01)
*E05F 15/668* (2015.01)

(52) U.S. Cl.
CPC ............ *E05F 15/77* (2015.01); *E05F 15/668* (2015.01); *E05Y 2201/41* (2013.01);
(Continued)

(58) Field of Classification Search
CPC ......... E05F 15/77; E05F 15/668; E05F 15/41; E05F 15/70; E05F 15/40; E05Y 2201/41;
(Continued)

(56) References Cited

U.S. PATENT DOCUMENTS 4,490,999 A * 1/1985 Castle ..................... E05B 41/00 70/330
6,259,352 B1 7/2001 Yulkowski et al.
(Continued)

FOREIGN PATENT DOCUMENTS

EP 1653035 5/2006
GB 2223531 4/1990
(Continued)

OTHER PUBLICATIONS

Swedish Search Report in Swedish Pat. Appl. No. 1830365-1, dated Aug. 22, 2019.
(Continued)

*Primary Examiner* — Nam V Nguyen
(74) *Attorney, Agent, or Firm* — Wissing Miller LLP

(57) ABSTRACT

Present invention relates to an automatic door operator 10 and method of operating said automatic door operator 10. The automatic door operator 10 is arranged to operate the movable door member D1, said automatic door operator 10 comprising a drive unit 24 for moving the movable door member D1 between a closed position and an open position, a controller 32 configured to control said drive unit 24 and a sensor S1 operatively connected to said controller 32. The sensor is configured to monitor the operation of the movable door member D1 and transfer sensor data to said controller 32.

17 Claims, 5 Drawing Sheets

(52) U.S. Cl.
CPC ..... *E05Y 2201/422* (2013.01); *E05Y 2400/33* (2013.01); *E05Y 2400/354* (2013.01); *E05Y 2400/66* (2013.01); *E05Y 2900/106* (2013.01); *E05Y 2900/132* (2013.01)

(58) Field of Classification Search
CPC ........... E05Y 2201/422; E05Y 2400/33; E05Y 2400/354; E05Y 2400/66; E05Y 2900/106; E05Y 2900/132; E05Y 2201/22; E05Y 2400/32; E05Y 2400/44; E05Y 2400/51; E05Y 2800/748
USPC ........................................................ 340/5.72
See application file for complete search history.

(56) References Cited

U.S. PATENT DOCUMENTS 6,346,889 B1 * 2/2002 Moss ...................... E05F 15/71 340/8.1
7,107,721 B2 * 9/2006 Sato ........................ E05B 83/40 49/281
7,158,043 B2 * 1/2007 Kirkland ................ G08B 13/08 340/545.7
7,187,150 B2 * 3/2007 Robb ................... G05B 19/351 318/266
7,207,142 B2 * 4/2007 Mullet .................... E05F 15/77 340/686.1
7,986,232 B2 * 7/2011 Sharma .................. G08B 25/14 340/552
8,264,323 B2 * 9/2012 Chandler, Jr. ..... G07C 9/00174 70/277
8,400,264 B2 * 3/2013 Mullet ............... G07C 9/00182 340/5.71
8,405,337 B2 * 3/2013 Gebhart .................. H02P 6/085 49/506
8,653,982 B2 * 2/2014 Yulkowski ......... G07C 9/00571 73/493
9,169,669 B2 * 10/2015 Clary ...................... E05B 41/00
9,600,950 B2 * 3/2017 Chutorash .............. G08C 17/02
10,614,647 B2 * 4/2020 Deneen .................. E05F 15/77
2003/0025337 A1 2/2003 Suzuki et al.
2004/0163318 A1 8/2004 Sato
2010/0011583 A1 5/2010 Gebhart et al.
2010/0127882 A1 * 5/2010 Sitarski ................... E05F 15/77 340/686.1
2012/0304715 A1 * 12/2012 Gore ...................... G08B 13/04 70/344

FOREIGN PATENT DOCUMENTS

KR 20120033637 4/2012
WO 2015077222 5/2015
WO 2019097051 5/2019

OTHER PUBLICATIONS

International Search Report in PCT/EP2019/085512, dated Mar. 20, 2020.

* cited by examiner

AUTOMATIC DOOR OPERATOR AND METHOD OF OPERATING AUTOMATIC DOOR OPERATOR

This application is a 371 of PCT/EP2019/085512 filed on Dec. 17, 2019, published on Jun. 25, 2020 under publication number WO 2020/127171, which claims priority benefits from Swedish Patent Application No. 1830365-1, filed on Dec. 19, 2018, the disclosure of which is incorporated herein by reference.

TECHNOLOGY FIELD

Present invention relates to an automatic door operator, an entrance system comprising said automatic door operator and a method of operating an automatic door operator.

BACKGROUND

Automatic entrance systems are equipped with door operators for controlling the operation of the door member or door members. The door operators are commonly provided with a drive unit and a controller for said purpose.

To provide selective entrance through the door, the door member or door members may be provided with locks or alternatively, the door operator in itself may have a locking function. In such entrance systems there is a need for assessing whether the door is locked or not. For solving said problem the entrance system may be provided with additional hardware in the form of switches sending signals to the controller of the operator when the door is locked. The electronic switches leads to a more complex entrance system and requires the implementation of additional hardware and further digital inputs to the controller. Furthermore, to retrofit an existing entrance system with the required features to assess whether the door is locked is a relatively complex, cumbersome and expensive process.

The present inventor has realized that there is room for improvement in this field.

SUMMARY

An object of the present invention is therefore to provide one or more improvements in the field of entrance systems.

According to an aspect an automatic door operator for an entrance system is provided. The entrance system has at least one movable door member. The automatic door operator is arranged to operate the movable door member. The automatic door operator comprises a drive unit for moving the movable door member between a closed position and an open position. The automatic door operator further comprises a controller configured to control said drive unit and a sensor operatively connected to said controller. The sensor is configured to monitor the operation of the movable door member and transfer sensor data to said controller.

The controller is configured to receive a lock detection command and in response to said lock detection command cause the drive unit to attempt to move the movable door member towards a position disposed between the closed position and open position.

Further, the controller is configured to determine a door member status indicating whether the movable door member is locked based on sensor data obtained from the sensor during the attempt to move the movable door member to the position and generate a door member status signal based on said door member status.

According to an aspect an entrance system is provided. The entrance system has at least one movable door member and further comprises an automatic door operator (10) according to the above.

According to an aspect a method of operating an automatic door operator for an entrance system. The entrance system has at least one movable door member, whereby the automatic door operator is arranged to operate the movable door member. The automatic door operator comprises a drive unit for moving the movable door member between a closed position and an open position, a controller configured to control said drive unit and a sensor operatively connected to said controller. The sensor is configured to monitor the operation of the movable door member and transfer sensor data to said controller.

The method comprises receiving a lock detection command and in response to the lock detection command causing the drive unit to attempt to move the movable door member to a position disposed between the closed position and open position.

The method further comprises determining a door member status indicating whether the movable door member is locked based on sensor data obtained from the sensor during the attempt to move the movable door member to the position and generating a door member status signal based on said door member status.

BRIEF DESCRIPTION OF THE DRAWINGS

Objects, features and advantages of embodiments of the invention will appear from the following detailed description, reference being made to the accompanying drawings.

DETAILED DESCRIPTION OF EMBODIMENTS

Figure 1:
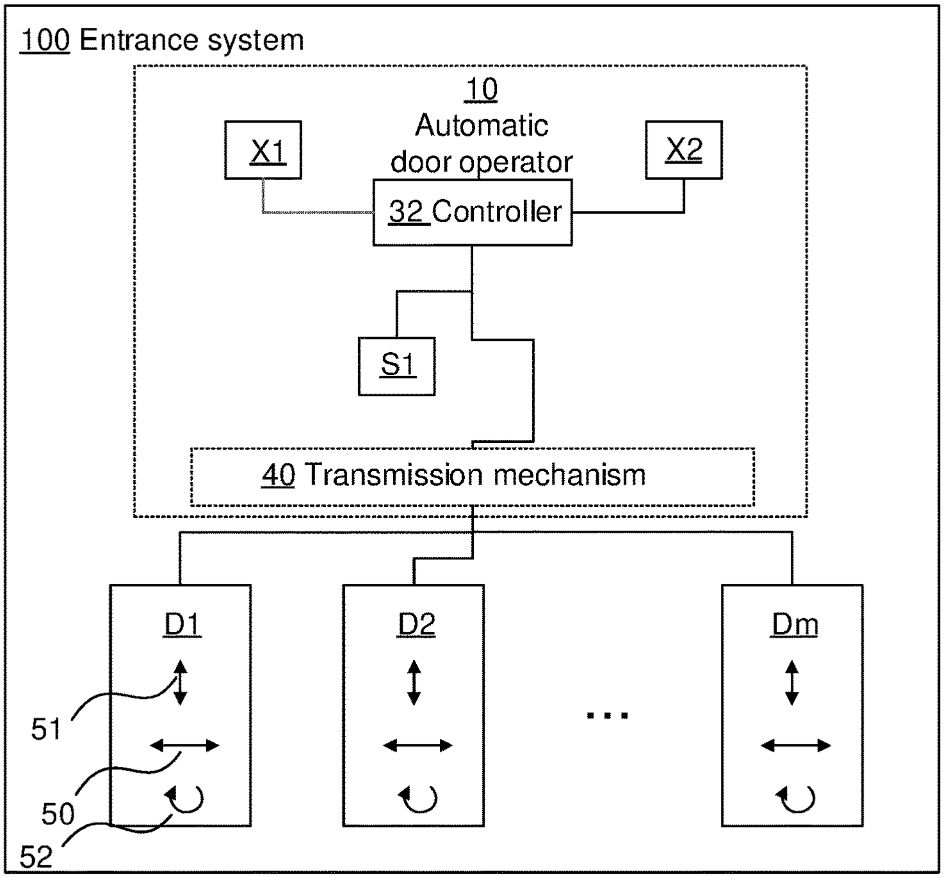
FIG. 1 is a schematic block diagram of an entrance system with an automatic door operator according to an embodiment of the present invention.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the detailed description of the particular embodiments illustrated in the accompanying drawings is not intended to be limiting of the invention. In the drawings, like numbers refer to like elements.

FIG. 1 is a schematic block diagram illustrating an entrance system 100. The entrance system 100 comprises one or more movable door members Dl . . . Dm, and an automatic door operator 10 for causing movements of the door members Dl . . . Dm between closed and open positions. In FIG. 1, a transmission mechanism 40 conveys mechanical power from the automatic door operator 10 to the movable door members Dl . . . Dm.

Figure 2:
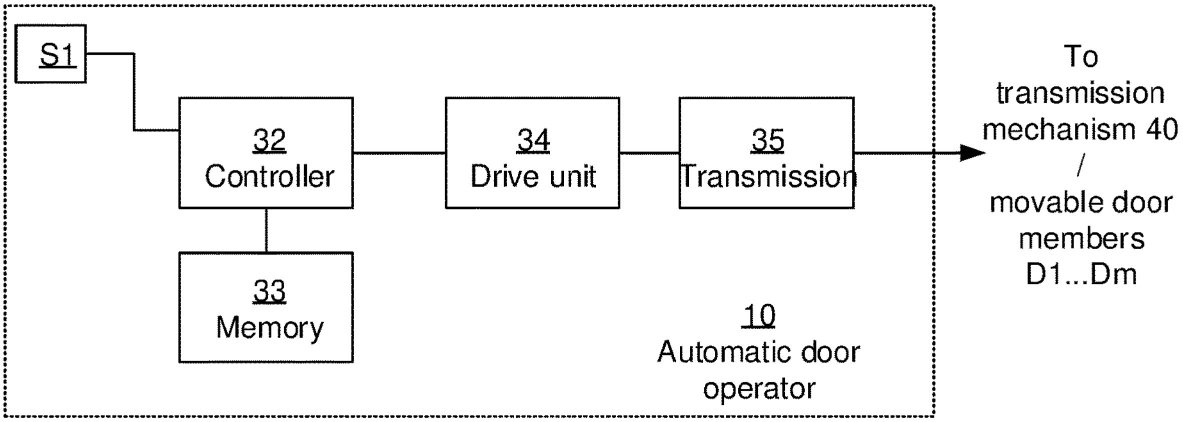
FIG. 2 is a schematic block diagram of an automatic door operator according to an embodiment of the present invention.

FIG. 2 illustrates one embodiment of the automatic door operator 10 in more detail. Pursuant to the invention, a controller 32 is provided for the entrance system 100. The controller 32 may be part of the automatic door operator 10 as seen in the embodiment of FIG. 2.

The embodiment of the automatic door operator 10 shown in FIG. 2 will now be described in more detail. The automatic door operator 10 may typically be arranged in conjunction with a frame or other structure which supports the door members Dl . . . Dm for movements between closed and open positions, often as a concealed overhead installation in or at the frame or support structure.

In addition to the aforementioned controller 32, the automatic door operator 10 comprises a drive unit 34, typically an electrical motor, being connected to an internal transmission or gearbox 35. An output shaft of the transmission 35 rotates upon activation of the motor 34 and is connected to the external transmission mechanism 40. The external transmission mechanism translates the motion of the output shaft of the transmission 35 into an opening or a closing motion of one or more of the door members D1 . . . Dm with respect to the frame or support structure.

The controller 32 is configured for performing different functions of the automatic door operator 10 in the different operational states of the entrance system 100. The controller 32 is operatively connected to the sensor S1. Hence, the sensors S1 is connected to data inputs of the controller 32. At least some of the different functions performable by the controller 32 have the purpose of causing desired movements of the door members D 1 . . . Dm. To this end, the controller 32 has at least one control output connected to the motor 34 for controlling the actuation thereof.

The controller 32 may be implemented in any known controller technology, including but not limited to microcontroller, processor (e.g. PLC, CPRPU, DSP), FPGA, ASIC or any other suitable digital and/or analog circuitry capable of performing the intended functionality.

The controller 32 also has an associated memory 33. The memory 33 may be implemented in any known memory technology, including but not limited to E(E)PROM, S(D) RAM or flash memory. In some embodiments, the memory 33 may be integrated with or internal to the controller 32. The memory 33 may store program instruction for execution by the controller 32, as well as temporary and permanent data used by the controller 32.

In one aspect of the invention, the automatic door operator 10 is for the entrance system 100 having at least one movable door member D1. The automatic door operator 10 is arranged to operate the movable door member D1. The automatic door operator 10 comprises the drive unit 24 for moving the movable door member D1 between a closed position and an open position. The closed position is herein defined as a position wherein the movable door member D1 seals of passage through the entrance system 100. Correspondingly, the open position is herein defined as a position wherein the movable door member D1 enables passage through the entrance system 100.

The automatic door operator 10 further comprises the controller 32 configured to control the drive unit 24 and the sensor S1 operatively connected to said controller 32. The sensor S1 is configured to monitor the operation of the movable door member D1 and transfer sensor data to said controller 32.

Worded differently, said sensor S1 is configured to monitor the operation of the movable door member D1 by means of monitoring parameters associated with the operation of the movable door member D1.

Figure 3:
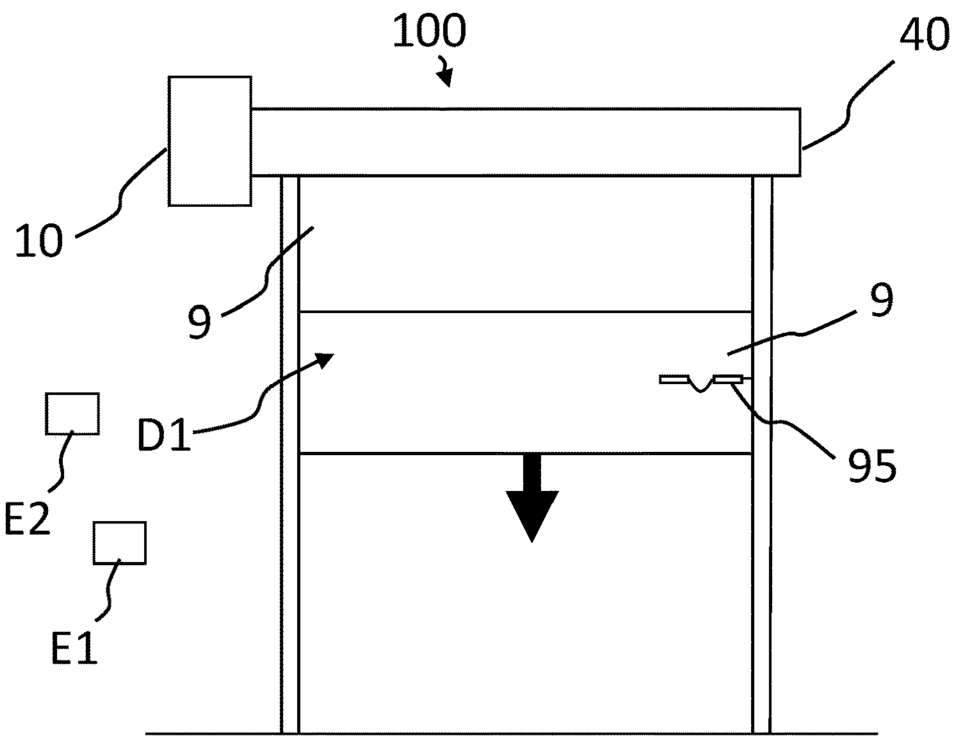
FIG. 3 depicts a schematic entrance system according to an embodiment of the present invention in a first state.
Figure 4:
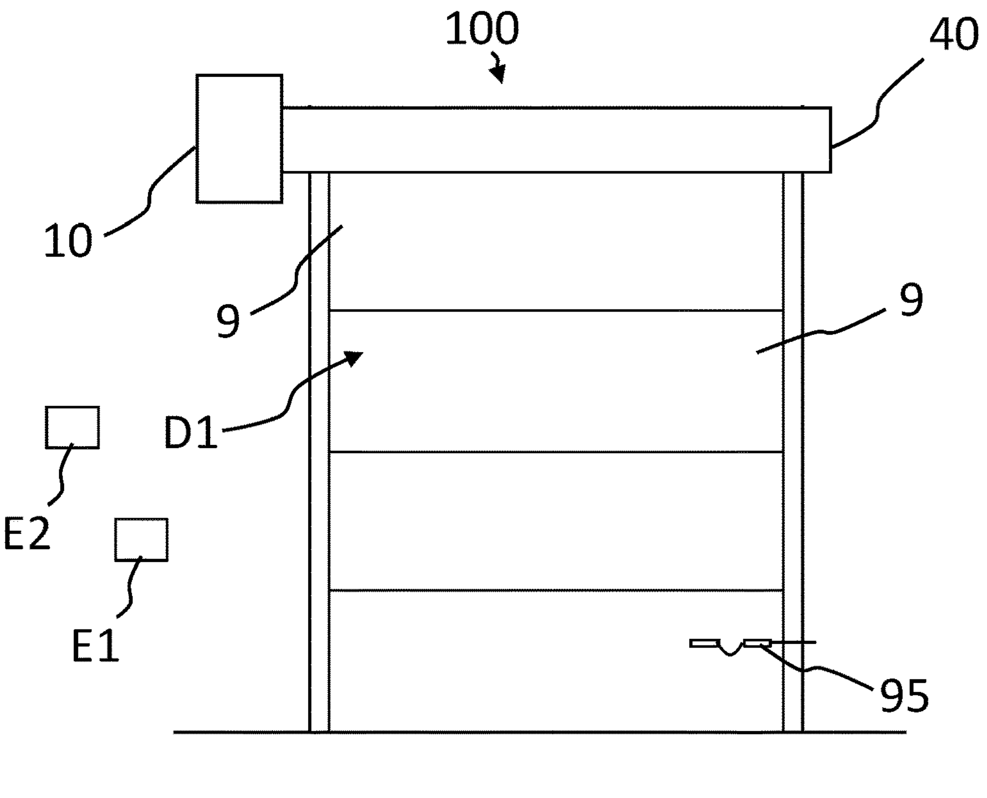
FIG. 4 depicts a schematic entrance system according to an embodiment of the present invention in a second state.
Figure 5:
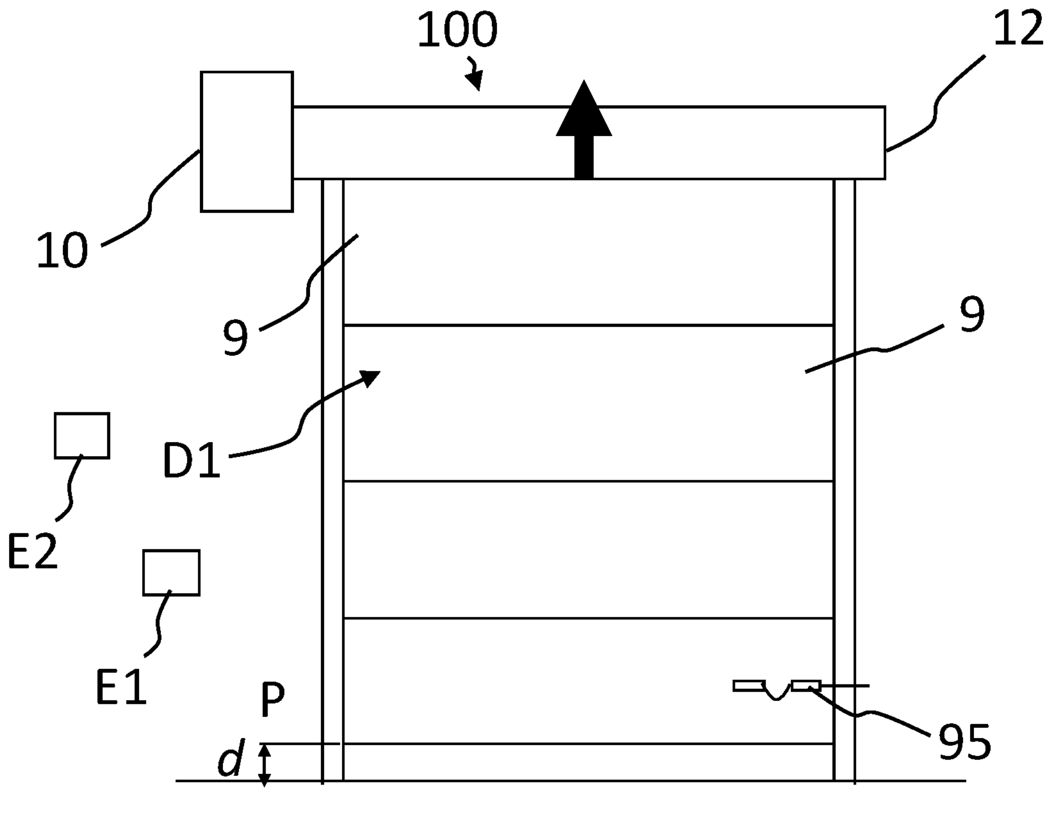
FIG. 5 depicts a schematic entrance system according to an embodiment of the present invention in a third state.

Again referring to FIG. 1, the automatic door operator may comprise a receiving communication interface X1 operatively connected to the controller 32, said receiving communication interface X1 being configured to receive the lock detection command from an external device E1 which will be further described in FIG. 3-5.

The automatic door operator may further comprise a transmitting communication interface X2 operatively connected to the controller 32. The transmitting interface X2 may be configured to transmit the door member status signal to an external device E2 which will be further described in FIG. 3-5.

FIGS. 3-5 depicts an exemplary entrance system implementing the automatic door operator according to an embodiment of the present invention. The entrance system 100 is an overhead door system with the movable door member D1 moving between a vertical closed position and an horizontal open position. The movable door member D1 is movable along a track by means of the automatic door operator 10 being in driving connection with said movable door member D1. The movable door member D1 comprises a plurality of interconnected door sections 9.

The drive unit of the automatic door operator 10 is connected to a drive shaft in driving connection with the movable door member D1. The drive shaft is connected to the transmission mechanism 40 which according to the entrance system depicted in FIG. 3-5 is in the form of a cable drive for transferring the torque from the drive shaft to the movable door member D1.

In many cases automatic entrance systems are provided with locks, for example in the form of mechanical locks, which serves to hold the movable door member in the closed position. In some entrance systems with a plurality of movable door members such as slide doors, the lock may serve to hold the plurality of movable door members in the closed position. To check if the door is locked, electric switches has been used in the past. However, such arrangements require additional hardware as well as electrical connections in the entrance system.

Hence, according to an aspect of the invention the controller is configured to receive a lock detection command and in response to said lock detection command cause the drive unit 24 to attempt to move the movable door member D1 towards a position P disposed between the closed position and open position. The position P is disposed between said closed position and open position along the movement trajectory of the movable door member D1. The position P is disposed substantially closer to the closed position than the open position. This may be advantageous for security reasons due to the door not opening so as to allow access through the entrance system when being at its position P.

In order to perform a check whether the door member D1 is locked, the controller 32 is further configured to determine a door member status indicating whether the movable door member D1 is locked based on sensor data obtained from the sensor S1 during the attempt to move the movable door member to the position P. Worded differently, the controller is configured to determine a door member status associated with the movable door member being locked or a door member status associated with the movable door member being unlocked based on said sensor data.

To provide the user an indication of the door member status, e.g. whether the door member D1 is locked, the controller 32 is further configured to generate a door member status signal based on said door member status.

Hence, an automated check to detect if the movable door member D1 is locked may be performed without requiring components not included in a conventional entrance system. Further, the above described automatic door operator makes it possible to retrofit existing automatic door operators with the functionality due to the check only utilizing the standard components of the automatic door operator. Said retrofitting may be achieved by simply reconfiguring the automatic door operator to perform the check.

In one embodiment, the controller 32 may be further configured to cause the drive unit 24 to attempt to move the movable door member D1 towards the position P during a predefined time period TSET. Accordingly, the controller 32 may only urge the drive unit 34 to move the movable door member D1 during a certain time period. Hence, the drive unit is not subjected to unnecessary load and wear due to attempting to move the movable door member D1 to the position P when the door member D1 is locked for extended time periods of time.

The controller 32 may be configured to, after the predefined time period TSET has passed, cause the drive unit 24 to move the movable door member D1 to the closed position. Hence the movable door member D1 may return to its closed position after the check has been performed. In one embodiment, the controller 32 may be configured to cause the drive unit 24 to move the movable door member D1 to the closed position after a second predefined time period TSET2. The second predefined time period TSET2 may be longer than the predefined time period TSET, this may allow for ventilating air to pass through the entrance system before closing.

In one embodiment, the sensor S1 is configured to monitor the current provided to the drive unit 24 for powering said drive unit 24 or the position and/or movement of the movable door member D1. Accordingly, the sensor S1 may be configured to monitor the current provided to the drive unit 24 for powering said drive unit 24. Alternatively, the sensor S1 may be configured to monitor the position and/or movement of the movable door member D1.

In one embodiment, the entrance system may have a plurality of movable door members. In one embodiment, the sensor S1 may be configured to monitor each movable door member. In one embodiment, the automatic door operator may comprise a plurality of sensors each being configured to monitor one of the plurality of movable door members.

In one embodiment, wherein the sensor S1 is configured to monitor the position and/or movement of the of the movable door member D1, the controller 32 is configured to determine a door member status indicating that the movable door member D1 is locked if the movement of the movable door member D1 is halted prior to said movable door member D1 reaching the position P. Hence, the controller 32 may be configured to determine a door member status indicating that the movable door member is unlocked if the movement of the movable door member D1 reaches the position P.

In one embodiment, the controller 32 is configured to determine a door member status indicating that the movable door member D1 is locked if the movable door member D1 has not reached the position P during the predefined time period TSET. Consequently, the controller 32 may be configured to determine a door member status indicating that the movable door member is unlocked if the movement of the movable door member D1 reaches the position P during the time period TSET.

The movement and/or position may be monitored by any conventional means known in the field of automatic door operators. For example, the sensor S1 for monitoring said movement and/or position may be an encoder configured to monitor the rotational movement of the drive shaft connected to the drive unit 24. The drive shaft is in driving connection with the movable door member D1. The sensor S1 may alternatively or additionally be a position sensor mounted to the movable door member D1 configured to monitor the position and/or movement of the movable door member D1. The position sensor may be any type of position sensor known in the prior art, such as a hall-effect sensor, an ultrasonic sensor, a capacitive transducer and an optical sensor.

In one embodiment, wherein the sensor S1 is configured to monitor the current provided to the drive unit 24 for powering said drive unit 24. The controller 32 may hence be configured to determine a door member status indicating that the movable door member D1 is locked if said current exceeds a threshold current TC. The threshold current TC is indicative of the movement of the movable door member being obstructed. This may be due to the drive unit 34 trying to force the door open against the lock. The controller 32 may be configured to determine door member status indicating that the movable door member D1 is unlocked if said current does not exceed the threshold current TC. Preferably, the controller 32 is configured to determine a door member status indicating that the movable door member D1 is unlocked if said current does not exceed the threshold current TC during the time period TSET.

Further referencing FIG. 3-5, the sequence performed by means of the controller according to an embodiment is further depicted. In FIG. 3 the controller has received the lock detection command. The controller 32 is configured to cause the movable door member D1 to move to the closed position in response to the lock detection command prior to causing the drive unit 24 to attempt to move the movable door member D1 towards the position P.

In some instances, the door may not have been closed properly which may cause an incorrect assessment regarding the door member being locked. By means of securing that the door member being in the closed position a more reliable manner of assessing whether door member is locked is achieved.

The lock detection command may be sent from the external device E1. Hence, the operator may by means of a user interface of the external device E1 send the lock detection command to the automatic door operator 10. More specifically the external device E1 is configured to send the lock detection command to the receiving communication interface X1 of the automatic door operator 10. Said receiving communication interface X1 is in turn configured to transfer the lock detection command to the controller 32, whereby the sequence for determining if the door member is locked is performed in response to the controller 32 receiving said lock detection command.

In one embodiment, the external device E1 may be for example a user control panel. The user control panel may be arranged in the vicinity of the entrance system 100. The user control panel may be connected to the automatic door operator 10, e.g. the receiving communication interface X1, by means of any conventional signal transferring system, e.g. by wire or by means of a wireless connection.

In one embodiment, the external device E1 may be a computing device, such as a smart phone, tablet or computer. By means of the user interface of the computing device a user may send the lock detection command to automatic door operator 10, e.g. the controller 32 by means of the receiving communication interface X1. Hence, the computing device may be operatively connected to the receiving communication interface X1. The computing device may be connected to the receiving communication interface X1 via any commonly known suitable wireless connection such as for example Bluetooth, Wi-Fi, mobile network (2G, 3G, 4G, 5G, GSM etc.), or by means of a wire connection, such as Ethernet cable, USB etc.

In one embodiment, the receiving communication interface X1 and the external device E1 are connected via a server. The external device E1 may hence be configured to send the lock detection command via the server. The external device E1 and the receiving communication interface X1 may be operatively connected to the external server. The computing device may be connected to the receiving communication interface X1 via any commonly known suitable wireless connection such as for example Bluetooth, Wi-Fi, mobile network (2G, 3G, 4G, 5G, GSM etc.), or by means of a wire connection, such as Ethernet cable, USB etc. The server may be a cloud-based server.

To exemplify, a user may request a check whether the door is locked by sending a lock detection command from the computing device. The controller may initiate the sequence for determining whether the door member is locked and output a door member status signal to the computing device, whereby the GUI of the computing device indicates whether the door is locked based on the door member status signal.

As depicted in said FIGS. 3-5, the entrance system 100 may further comprise a lock 95 arranged to selectively lock the movable door member D1 in place. The lock 95 may be arranged to lock the movable door member D1 in the closed position.

In one embodiment the lock 95 may be in the form of an automated lock unit 95. The controller 32 is operatively connected to the automated lock unit 95 for prompting said automated lock unit 95 to lock the movable door member D1.

Referencing FIG. 4, the controller D1 is further configured to, in response to the lock detection command, prompt the automated lock unit 95 to lock the movable door member D1. As seen in said FIG. 4 this may be performed after the movable door member D1 has been caused to move to the closed position. Accordingly, the controller 32 may be configured to prompt the automated lock unit 95 to lock the movable door member D1 after moving the movable door member D1 to the closed position in response to receiving the lock detection command. This allows for the user to get an indication whether the lock in itself is malfunctional.

With reference to FIG. 5, the movable door member D1 is prompted to move towards the position P. The position P may be defined as a distance d, e.g. a vertical distance, from the closed positon, e.g. the floor of the entrance system. It is recognized that depending on the entrance system properties the position P may be defined differently. According to the present example, the distance d may be under 10 cm. In a swing door system the position P may be defined as an angle of the movable door member D1 in relation to the movable door member angle in the closed positon. After the predefined time period TSET has passed the movable door member D1 is moved back to the closed positon and the movement sequence is finished.

The lock detection command may be sent from the external device E1. Hence, the operator may by means of a user interface of the external device E1 send the lock detection command to the automatic door operator 10. More specifically the external device E1 is configured to send the lock detection command to the receiving communication interface X1 of the automatic door operator 10. Said receiving communication interface X1 is in turn configured to transfer the lock detection command to the controller 32, whereby the lock detection check is performed in response to the controller 32 receiving said lock detection command.

The generated door member status signal is transferred to the external device E2. In one embodiment, the external device E2 may be an indicating device, such as a light or speaker, operatively connected to the transmitting communication interface X2. Said indicating device may be configured to generate an alert or indication based on the generated door member status. The indicating device may be arranged in the vicinity of the entrance system 100. In one embodiment, the external device configured to send the lock detection command and the external device configured to receive the door member status signal are the same external device.

In one embodiment, the external device E2 may be for example a user control panel. The user control panel may be arranged in the vicinity of the entrance system 100. The user control panel may be connected to the automatic door operator 10, e.g. the transmitting communication interface X2, by means of any conventional signal transferring system, e.g. by wire or by means of a wireless connection. The user control panel may comprise a graphical user interface (GUI) for presenting information to the user based on the generated door member status signal. For example, the GUI may present a graphical representation indicating a locked door or an unlocked door based on said door member status signal. The user control panel may be operatively connected to both the transmitting communication interface and the receiving communication interface.

In one embodiment, the external device E2 may be a computing device, such as a smart phone, tablet or computer. The user may thus be alerted regarding the door being locked by means of a GUI of the computing device. Hence, the computing device may be operatively connected to the transmitting communication interface X2. The computing device may be connected to the transmitting communication interface X2 via any commonly known suitable wireless connection such as for example Bluetooth, Wi-Fi, mobile network (2G, 3G, 4G, 5G, GSM etc.), or by means of a wire connection, such as Ethernet cable, USB etc. The computing device may comprise the graphical user interface (GUI) for presenting information to the user based on the generated door member status signal. For example, the GUI may present a graphical representation indicating a locked door or an unlocked door based on said door member status signal. The computing device may be operatively connected to both the transmitting communication interface and the receiving communication interface.

In one embodiment, the transmitting communication interface X2 and the external device E2 are connected via a server. The external device E2 may hence be configured to receive the door member status signal via the server. The external device E2 and the transmitting communication interface X2 may be operatively connected to the external server. The computing device may be connected to the transmitting communication interface X2 via any commonly known suitable wireless connection such as for example Bluetooth, Wi-Fi, mobile network (2G, 3G, 4G, 5G, GSM etc.), or by means of a wire connection, such as Ethernet cable, USB etc. The server may be a cloud-based server.

Notably, the entrance system may be any one of the following: an overhead entrance system, an industrial port system, a garage port system, a revolving door system, a swing door system, a rolling door system and a sliding door system.

According to an aspect, an entrance system is provided. The entrance system has at least one movable door member D1. The entrance system 100 may further comprise the automatic door operator 10 in accordance with any of the described embodiments.

Figure 6:
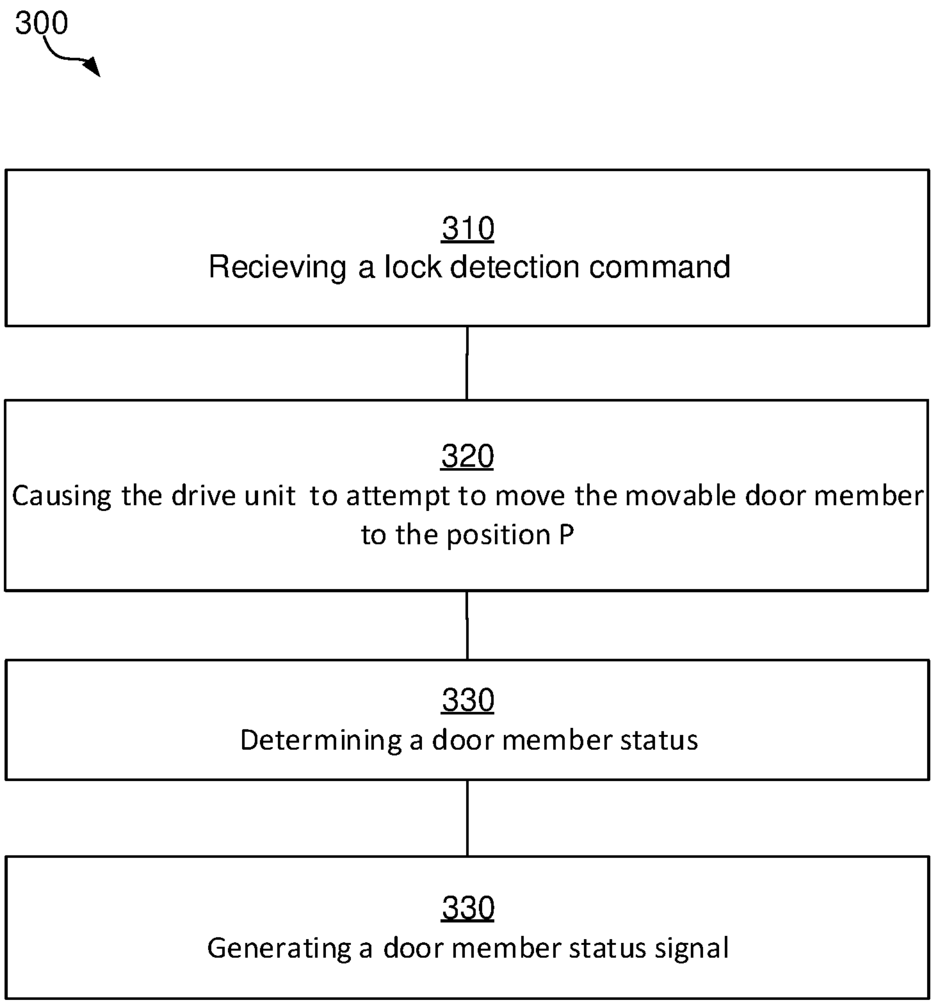
FIG. 6 is a flow chart of a method according to an embodiment of the present invention.
Figure 7:
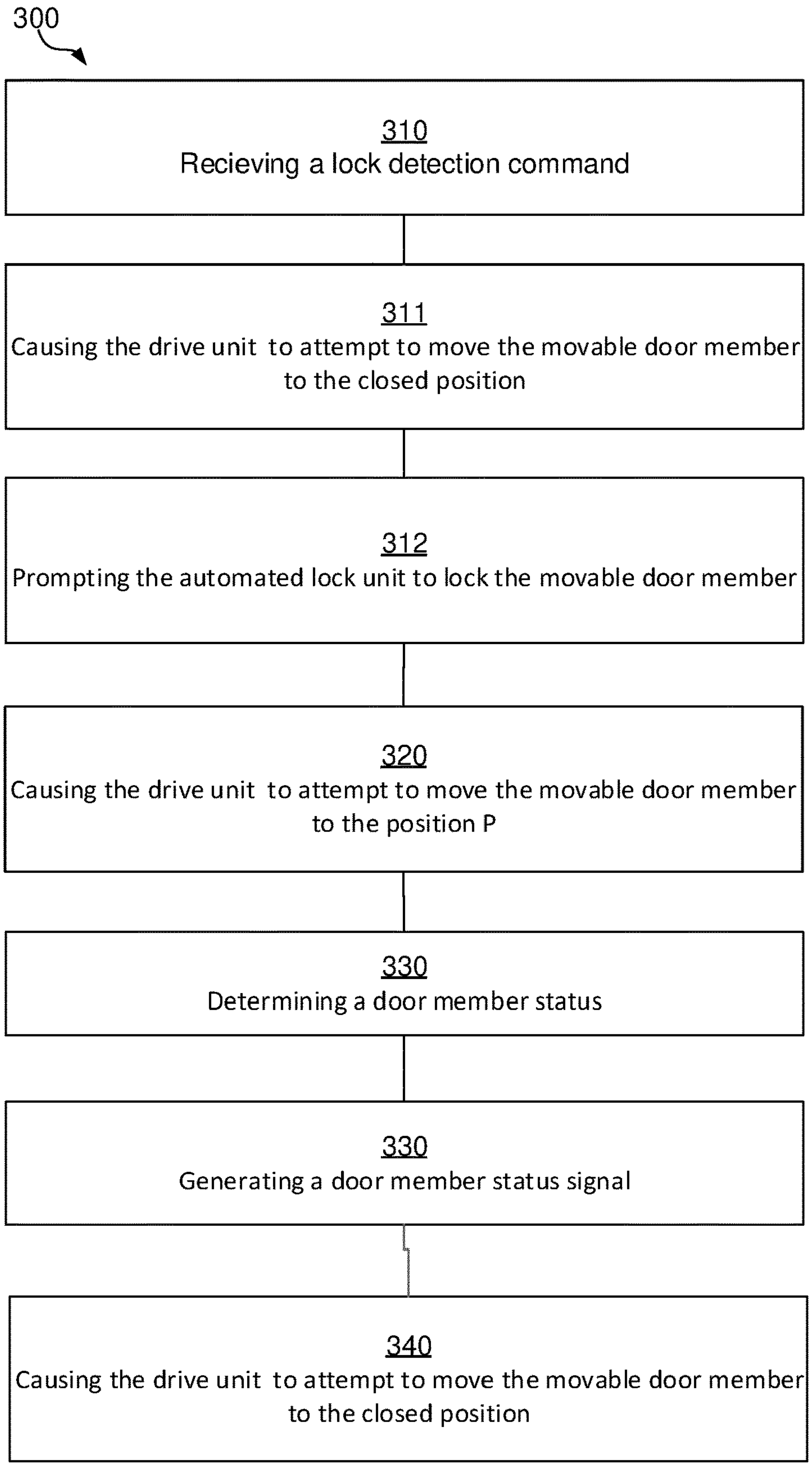
FIG. 7 is a flow chart of a method according to an embodiment of the present invention.

The method for performing the locked door check depicted in FIG. 3-5 is further descried with reference to FIG. 6. The method 300 comprises receiving a lock detection command 310 and in response to the lock detection command causing the drive unit 24 to attempt to move the movable door member D1 to the position P disposed between the closed position and open position.

The method further comprises determining a door member status indicating whether the movable door member D1 is locked based on sensor data obtained from the sensor S1 during the attempt to move the movable door member D1 to the position P and generating a door member status signal based on said door member status. Worded differently, the method comprises determining a door member status associated with the movable door member being locked or a door member status associated with the movable door member being unlocked based on said sensor data.

As described with reference to FIG. 3-5, the sensor S1 may be configured to monitor the current provided to the drive unit 24 for powering said drive unit 24 or the position and/or movement of the movable door member D1.

In one embodiment, the drive unit 24 is caused to attempt to move the movable door member D1 to the position P during the predefined time period TSET.

Turning to Fig, the method may further comprise to, in response to receiving the lock detection command, cause the movable door member D1 to move to the closed position, prior to causing the drive unit 24 to attempt to move the movable door member D1 towards the position P.

The method may further comprise causing the drive unit 24 to move the movable door member D1 to the closed position after the predefined time period TSET has passed.

In one embodiment, the method may further comprise in response to receiving the lock detection command causing the movable door member D1 to move to the closed position, prior to causing the drive unit 24 to attempt to move the movable door member D1 towards the position P.

As described with reference to FIG. 3-5, the controller 32 may be operatively connected to the automated lock unit 95 for prompting said automated lock unit 95 to lock the movable door member D1. Hence, the method may further comprise to, in response to the lock detection command, prompting the automated lock unit 95 to lock the movable door member D1.

In one embodiment, wherein the sensor S1 is configured to monitor the position and/or movement of the of the movable door member D1 whereby the method may further comprise determining a door member status indicating that the movable door member D1 is locked if the movement of the movable door member D1 is halted prior to said movable door member D1 reaching the position P.

The sensor S1 may be configured to monitor the position and/or movement of the movable door member D1. Accordingly, the method may comprise determining a door member status indicating that the movable door member D1 is locked if the movable door member D1 has not reached the position P during the predefined time period TSET. Said sensor S1 may be an encoder configured to monitor the rotational movement of a drive shaft connected to the drive unit 24, said drive shaft being in driving connection with the movable door member D1. Alternatively, the sensor S1 may be a position sensor mounted to the movable door member D1 configured to monitor the position and/or movement of the movable door member D1.

The sensor S1 may be configured to monitor the current provided to the drive unit 24 for powering said drive unit 24. The method may further comprise determining a door member status indicating that the movable door member D1 is locked if said current exceeds a threshold current TC.

The method may further comprise receiving the lock detection command from the external device E1, preferably by means of the receiving communication interface X1.

In one embodiment, the method may further comprise transmitting the door member status signal to the external device E2, preferably by means of the transmitting communication interface X2.

In one embodiment, the method may further comprise receiving the lock detection command from the external device and transmitting the door member status signal said external device E2. Accordingly the external device may be configured to both receive the door member status signal and send the lock detection command.

Further, a door operator, entrance system and method may be provided in accordance with any of the following clauses.

1. An automatic door operator (10) for an entrance system having at least one movable door member (D1), whereby the automatic door operator (10) is arranged to operate the movable door member (D1), said automatic door operator (10) comprising a drive unit for moving the movable door member (D1) between a closed position and an open position, a controller configured to control said drive unit and a sensor (S1) operatively connected to said controller, said sensor being configured to monitor the operation of the movable door member (D1) and transfer sensor data to said controller, whereby the controller is configured to:

receive a lock detection command and in response to said lock detection command cause the drive unit to attempt to move the movable door member (D1) towards a position (P) disposed between the closed position and open position, determine a door member status indicating whether the movable door member (D1) is locked based on sensor data obtained from the sensor (S1) during the attempt to move the movable door member to the position (P), and generate a door member status signal based on said door member status.

2. The automatic door operator according to clause 1, wherein the controller is further configured to cause the drive unit to attempt to move the movable door member (D1) towards the position (P) during a predefined time period (TSET).

3. The automatic door operator according to clause 2, wherein the controller is configured to, after the predefined time period (TSET) has passed, cause the drive unit (24) to move the movable door member (D1) to the closed position.

4. The automatic door operator according to any of the preceding clauses, wherein the controller is configured to cause the movable door member (D1) to move to the closed position in response to the lock detection command prior to causing the drive unit to attempt to move the movable door member (D1) towards the position (P).

5. The automatic door operator according to any one of the preceding clauses, wherein the sensor (S1) is configured to monitor the current provided to the drive unit (24) for powering said drive unit or the position and/or movement of the movable door member (D1).

6. The automatic door operator according to clause 5, wherein the sensor (S1) is configured to monitor the position and/or movement of the of the movable door member (D1), whereby the controller is configured to determine a door member status indicating that the movable door member (D1) is locked if the movement of the movable door member (D1) is halted prior to said movable door member (D1) reaching the position (P).

7. The automatic door operator according to clause 5 or 6, wherein the sensor (S1) is configured to monitor the position and/or movement of the movable door member (D1), whereby the controller is configured to determine a door member status indicating that the movable door member (D1) is locked if the movable door member (D1) has not reached the position (P) during the predefined time period (TSET).

8. The automatic door operator according to any one of clause 5 to 7, wherein the sensor (S1) is an encoder configured to monitor the rotational movement of a drive shaft connected to the drive unit, said drive shaft being in driving connection with the movable door member (D1).

9. The automatic door operator according to any one of clause 5 to 7, wherein the sensor (S1) is a position sensor mounted to the movable door member (D1) configured to monitor the position and/or movement of the movable door member (D1).

10. The automatic door operator according to clause 5, wherein the sensor (S1) is configured to monitor the current provided to the drive unit for powering said drive unit, whereby the controller is configured to determine a door member status indicating that the movable door member (D1) is locked if said current exceeds a threshold current (TC).

11. The automatic door operator according to any of the preceding clauses, wherein the controller is operatively connected to an automated lock unit (95) for prompting said automated lock unit (95) to lock the movable door member (D1), whereby said controller (D1) is further configured to, in response to the lock detection command, prompt the automated lock unit (95) to lock the movable door member (D1).

12. The automatic door operator according to any one of the preceding clauses, further comprising a receiving communication interface operatively connected to the controller, said receiving communication interface being configured to receive the lock detection command from an external device (E1).

13. The automatic door operator according to any one of the preceding clauses, further comprising a transmitting communication interface operatively connected to the controller, said transmitting communication interface being configured to transmit the door member status signal to an external device (E2).

14. The automatic door operator according to any of the preceding clauses, wherein the entrance system is any one of the following: an overhead entrance system, an industrial port system, a garage port system, a revolving door system, a swing door system, a rolling door system and a sliding door system.

15. An entrance system having at least one movable door member (D1), the entrance system comprising an automatic door operator (10) according to any of the clauses 1-14.

16. A method of operating an automatic door operator (10) for an entrance system, the entrance system (10) having at least one movable door member (D1), whereby the automatic door operator (10) is arranged to operate the movable door member (D1), said automatic door operator (10) comprising a drive unit for moving the movable door member (D1) between a closed position and an open position, a controller configured to control said drive unit and a sensor operatively connected to said controller, said sensor (S1) being configured to monitor the operation of the movable door member (D1) and transfer sensor data to said controller, wherein the method comprises:

receiving a lock detection command;

in response to the lock detection command causing the drive unit to attempt to move the movable door member (D1) to a position (P) disposed between the closed position and open position;

determining a door member status indicating whether the movable door member (D1) is locked based on sensor data obtained from the sensor (S1) during the attempt to move the movable door member (D1) to the position (P); and generating a door member status signal based on said door member status.

17. The method according to clause 16, wherein the drive unit is caused to attempt to move the movable door member (D1) to the position (P) during a predefined time period (TSET).

18. The method according to clause 17, further comprising causing the drive unit to move the movable door member (D1) to the closed position after the predefined time period (TSET) has passed.

19. The method according to any one of the clauses 16 to 18, further comprising in response to receiving the lock detection command causing the movable door member (D1) to move to the closed position, prior to causing the drive unit to attempt to move the movable door member (D1) towards the position (P).

20. The method according to any of the clauses 16 to 19, wherein the sensor (S1) is configured to monitor the current provided to the drive unit for powering said drive unit or the position and/or movement of the movable door member (D1).

21. The method according to clause 20, wherein the sensor (S1) is configured to monitor the position and/or movement of the of the movable door member (D1), whereby the method further comprises determining a door member status indicating that the movable door member (D1) is locked if the movement of the movable door member (D1) is halted prior to said movable door member (D1) reaching the position (P).

22. The method according to clause 20 or 21, wherein the sensor (S1) is configured to monitor the position and/or movement of the movable door member (D1), whereby the method further comprises determining a door member status indicating that the movable door member (D1) is locked if the movable door member (D1) has not reached the position (P) during the predefined time period (TSET).

23. The method according to any one of clause 20 to 22, wherein the sensor (S1) is an encoder configured to monitor the rotational movement of a drive shaft connected to the drive unit, said drive shaft being in driving connection with the movable door member (D1).

24. The method according to any one of clause 20 to 22, wherein the sensor (S1) is a position sensor mounted to the movable door member (D1) configured to monitor the position and/or movement of the movable door member (D1).

25. The method according to clause 20, wherein the sensor (S1) is configured to monitor the current provided to the drive unit for powering said drive unit, whereby the method further comprises determining a door member status indicating that the movable door member (D1) is locked if said current exceeds a threshold current (TC).

26. The method according to any one of the clauses 16 to 25, whereby the controller is operatively connected to an automated lock unit (95) for prompting said automated lock unit (95) to lock the movable door member (D1), wherein the method comprises, in response to the lock detection command, prompting the automated lock unit (95) to lock the movable door member (D1).

27. The method according to any one of the clauses 16 to 26, whereby the automatic door operator (10) further comprises a receiving communication interface (X1) operatively connected to the controller, wherein the method further comprises receiving the lock detection command from an external device (E1).

28. The method according to any one of the clauses 16 to 27, whereby the automatic door operator (10) further comprises a transmitting communication interface (X2) operatively connected to the controller, wherein the method further comprises transmitting the door member status signal to an external device (E2).

The invention has been described above in detail with reference to embodiments thereof. However, as is readily understood by those skilled in the art, other embodiments are equally possible within the scope of the present invention, as defined by the appended claims.

The invention claimed is:

1. An automatic door operator for an entrance system having at least one movable door member, whereby the automatic door operator is arranged to operate the movable door member, said automatic door operator comprising a drive unit for moving the movable door member between a closed position and an open position, a controller configured to control said drive unit and a sensor operatively connected to said controller, said sensor being configured to monitor the operation of the movable door member and transfer sensor data to said controller, whereby the controller is configured to:

receive a lock detection command and in response to said lock detection command cause the drive unit to attempt to move the movable door member towards a position (P) disposed between the closed position and open position, wherein such attempt to move the door member is opposed by a lock in a locked status, determine a door member status indicating whether the movable door member is locked by the lock in the locked status based on sensor data obtained from the sensor during the attempt to move the movable door member to the position (P), and generate a door member status signal based on said door member status.

2. The automatic door operator according to claim 1, wherein the controller is further configured to cause the drive unit to attempt to move the movable door member towards the position (P) during a predefined time period (TSET).

3. The automatic door operator according to claim 2, wherein the controller is configured to, after the predefined time period (TSET) has passed, cause the drive unit to move the movable door member to the closed position.

4. The automatic door operator according to claim 1, wherein the controller is configured to cause the movable door member to move to the closed position in response to the lock detection command prior to causing the drive unit to attempt to move the movable door member towards the position (P).

5. The automatic door operator according to claim 1, wherein the sensor is configured to monitor a current provided to the drive unit for powering said drive unit or the position or a movement of the movable door member.

6. The automatic door operator according to claim 5, wherein the sensor is configured to monitor the current provided to the drive unit for powering said drive unit, whereby the controller is configured to determine a door member status indicating that the movable door member is locked if said current exceeds a threshold current (TC).

7. The automatic door operator according to claim 1, further comprising a receiving communication interface operatively connected to the controller, said receiving communication interface being configured to receive the lock detection command from an external device.

8. The automatic door operator according to claim 1, further comprising a transmitting communication interface operatively connected to the controller, said transmitting communication interface being configured to transmit the door member status signal to an external device.

9. An entrance system having the at least one movable door member, the entrance system comprising the automatic door operator according to claim 1.

10. A method of operating an automatic door operator for an entrance system, the entrance system having at least one movable door member, whereby the automatic door operator is arranged to operate the movable door member, said automatic door operator comprising a drive unit for moving the movable door member between a closed position and an open position, a controller configured to control said drive unit, a lock, and a sensor operatively connected to said controller, said sensor being configured to monitor the operation of the movable door member and transfer sensor data to said controller, wherein the method comprises:

receiving a lock detection command;

in response to the lock detection command causing the drive unit to attempt to move the movable door member to a position (P) disposed between the closed position and open position, wherein such attempt to move the door member is opposed by the lock in a locked status;

determining a door member status indicating whether the movable door memberis locked by the lock in the locked status based on sensor data obtained from the sensor during the attempt to move the movable door member to the position (P); and generating a door member status signal based on said door member status.

11. The method according to claim 10, wherein the drive unit is caused to attempt to move the movable door member to the position (P) during a predefined time period (TSET).

12. The method according to claim 11, further comprising causing the drive unit to move the movable door member to the closed position after the predefined time period (TSET) has passed.

13. The method according to claim 10, further comprising in response to receiving the lock detection command causing the movable door member to move to the closed position, prior to causing the drive unit to attempt to move the movable door member towards the position (P).

14. The method according to claim 10, wherein the sensor is configured to monitor a current provided to the drive unit for powering said drive unit or the position and/or a movement of the movable door member.

15. The method according to claim 14, wherein the sensor is configured to monitor the current provided to the drive unit for powering said drive unit, whereby the method further comprises determining the door member status indicating that the movable door member is locked if said current exceeds a threshold current (TC).

16. The method according to claim 10, whereby the automatic door operator further comprises a receiving communication interface operatively connected to the controller, wherein the method further comprises receiving the lock detection command from an external device.

17. The method according to claim 10, whereby the automatic door operator further comprises a transmitting communication interface operatively connected to the controller, wherein the method further comprises transmitting the door member status signal to an external device.

* * * * *